United States Patent [19]
Tangsrud et al.

[11] B 3,928,639
[45] Dec. 23, 1975

[54] PROCESS FOR DEHYDRATING FROZEN FOOD PARTICLES

[75] Inventors: Nils Tangsrud; Ole Gabriel Devik, both of Trondheim, Norway

[73] Assignee: Sintef, Trondheim, Norway

[22] Filed: May 24, 1973

[21] Appl. No.: 363,337

[44] Published under the Trial Voluntary Protest Program on January 28, 1975 as document no. B 363,337.

Related U.S. Application Data

[63] Continuation of Ser. No. 782,760, Dec. 10, 1968, abandoned.

[30] Foreign Application Priority Data

Dec. 18, 1967 Norway............................ 171037/67

[52] U.S. Cl. ................. 426/444; 426/467; 426/473
[51] Int. Cl.² ........................ A23B 1/04; A23B 3/04
[58] Field of Search ............. 99/199, 204, 207, 208, 99/209; 426/444, 453, 467, 473, 384, 385; 34/10

[56] References Cited
UNITED STATES PATENTS

| | | | |
|---|---|---|---|
| 2,572,761 | 10/1951 | Rivoche................. | 99;426/199;385 |
| 2,572,762 | 10/1951 | Rivoche................. | 99;426/204;444 |
| 2,713,003 | 7/1955 | Rivoche............................. | 426/385 |
| 2,959,487 | 11/1960 | Notter..................... | 99;426/204;444 |
| 3,063,848 | 11/1962 | VanGelder.............. | 99;426/204;467 |
| 3,269,025 | 8/1966 | Dryden................... | 99;426/204;385 |

OTHER PUBLICATIONS

Food Dehydration II Products & Technology, VanArsdel (ed) Avi Publishing Co., Inc. Westport, Conn. 1964, pp. 76, 77.

*Primary Examiner*—Norman Yudkoff
*Assistant Examiner*—Martin G. Mullen
*Attorney, Agent, or Firm*—Wenderoth, Lind & Ponack

[57] ABSTRACT

The invention relates to a process for dehydration of food products, particularly fish and meat, by freezing the product to be dehydrated, subdividing it in frozen condition to particles and drying it by contacting it at substantially atmospheric pressure with a gaseous drying agent, by distributing the frozen particles on a movable or fixed carrier means, through which the drying agent is passed to form a firm porous mat and gradually increasing the velocity, and optionally the temperature, of the drying agent through said porous mat to continue the drying thereof after which the mat is torn up to a dehydrated powder.

3 Claims, No Drawings

PROCESS FOR DEHYDRATING FROZEN FOOD PARTICLES

This case is a continuation of application Ser. No. 782,760, filed Dec. 12, 1968, now abandoned.

The present invention relates to a process for dehydration of food products, particularly doughy, porridge-like or soup-like food products, or food products attaining such a consistency upon subdivision or milling under ordinary conditions, or food products requiring mild treatment conditions.

The drying of different types of food products requires different processes all according to the nature of the food product. While some food products, such as grainy ones, may easily be dried in a rapid and efficient manner, others require a long period of time as well as relatively complicated apparatus. For certain materials such as fish, further complications are added, since the duration of the drying as well as the temperature used must be kept within relatively narrow limits to avoid deterioration of the product.

British Pat. No. 948,517 describes a process for drying of products of the above mentioned type, and the problems in connection therewith are discussed in detail. According to the patent the material to be dried is first frozen, whereafter it is milled and distributed on a cascade plate or the like for drying. The drying is performed by applying heat to the material in vacuum, for instance by heating the cascade plate itself, whereby the water is sublimed and removed. The use of vacuum equipment for the drying, which is ordinary for the known freeze drying processes, is expensive and space requiring.

German Pat. No. 880,688 describes a drying process for vegetables and fruit, and the purpose of said process is primarily to inactivate enzymes or ferments present. According to the patent the material to be dried is first subjected to a freezing and a subdivision, whereafter the finely divided, frozen material is dried in ordinary manner, either at high vacuum without heating above 0°C, at moderate vacuum and slight heating, or for particularly finely divided vegetables or fruit, without vacuum and with heating.

According to the invention is provided a process for dehydration of food products, particularly fish and meat, by freezing the product to be dehydrated, subdividing it in frozen condition to particles and drying it by contacting it at substantially atmospheric pressure with a gaseous drying agent, said drying agent having a temperature above the thawing point of the product and moving relative to said product. The process is characterized in that the frozen particles are distributed on a movable or fixed carrier means, through which the drying agent is passed with an even distribution and with a velocity being sufficiently high to maintain the particle layer in an uplifted porous condition but sufficiently low so that said particles are not carried away by the flow of drying agent, whereby thawing occurs in the particle layer and causes a binding between the particles to form a porous mat, and the velocity of the drying agent through the particle layer and optionally the temperature of the drying agent is gradually increased as the firmness of the mat increases, until the desired level for the parameters decisive for drying, i.e. the velocity through the particle layer and the temperature of the drying agent, have been attained. Thus, as it also appears from the following examples the velocity of the drying agent through the particle layer during the first part of the drying is too low to allow an economical drying. However, the primary object of the introductory part is only to establish an "aggregate condition" permitting the drying to be carried out in an economically satisfactory manner by allowing the drying parameters, particularly the velocity of the drying agent, to be freely chosen according too ordinary drying principles after the mat has been established.

The water which is to be removed from the food product normally contains other substances dissolved, said substances leading to a depression of the freezing point/melting point of the water (the thawing point of the food product to be dehydrated).

Normally air is used as drying agent, but other gases can be used as well such as carbon dioxide and nitrogen.

The preparation of a dehydrated product may for instance be carried out as follows: The food product is frozen either in the form of pieces or as a whole mass to a temperature somewhat below the temperature at which all the water content freezes. In this condition the product is subdivided, for instance in a hammer mill, whereafter it is dried in finely divided and frozen condition by distributing it in a suitable layer on a porous carrier, and the drying agent having a temperature higher than the melting point of the water is forced through the layer. Due to the structure and the high water content of many food products the ice in the surface of the product will thaw more rapidly than the melting water evaporates within the temperature limits necessary for other reasons.

An important feature of the process is that when the water content is high and in addition the food product is of such a nature that it upon subdivison in thawed condition will form a dough through which the drying agent cannot pass, the established passage of the drying agent through the frozen finely divided food product and the high porosity caused thereby due to an intended degree of fluidization will permit the passage of the drying agent through the product layer to be maintained also after thawing of the material has started. When a proper velocity of the drying agent causing a certain fluidization has been chosen, characterized in that the particles get more or less uplifted without being carried away, the thawing in the surfaces of the particles discussed above will cause an adhesion of the particles where they touch each other. Due to the gradually increasing dry content on the surfaces of the particles while the thawing goes into the depth, the established adhesion will develop towards greater firmness, and this is improved by gradually increasing the velocity of the drying agent within the limits allowed by the bonding strength at all times.

The present process permits new technical solutions for drying, for instance by establishing a mechanical transportation of the product to be dried, such as on a porous belt or a wire cloth through which the drying agent passes. Further, different sections of the drying apparatus used may be adjusted to give the drying conditions which are most suitable at that stage of the drying.

The process of the invention has been illustrated below in connection with the drying of fish and meat, but it may advantageously also be used for other food products, particularly those which upon subdivision form doughy or gel-like masses making the drying difficult.

EXAMPLE 1

From a number of drying experiments the following example may be referred to as typical: 200 grams of cod fillet, frozen to −20°C, was subdivided in a nail mill to a defibrated mass which was immediately transferred to a porous bottom, whose porosity and resistance against passage of the drying air was sufficient to secure an even velocity of the drying air forced through the bottom. For building up the layer of the product the velocity of the drying air was adjusted to about 0.5 m/sec. which was the highest velocity that could be used without carrying away the food product. After the layer had been built up to a thickness of 15 mm the temperature of the drying air was increased to 30°C. As the thawing proceeded it appeared that the fish fibers adhered to each other so that the velocity of the air could be substantially increased, up to 5 m/sec. After 15 minutes the food product was taken out for control. The dry content had then increased from 20 to 85 percent.

The taste and the small of the dehydrated fish powder were essentially better than of fish powder prepared by previously known drying methods of similar type, and the storage stability was the same or somewhat better.

EXAMPLE 2

Clean cut beef was cut into cubes and steamed for 2 minutes at 105°C, whereafter the wet meat was frozen down to −28°C. After subdivision on a nail mill the resulting powder was spread on to a porous bottom in an even layer. For building up the layer of the meat the velocity of the drying air was adjusted to 0.3 to 0.5 m/sec. The building up of the layer was carried out as in the previous example, with the exception that the increase of the air velocity and temperature was somewhat slower, although the final values were the same. The resulting total dry content was 78 percent.

Upon an after-drying at 52°C the dry content in fish dehydrated according to example 1 was brought up to 95 percent and in the meat according to example 2 to about 92 percent.

Similar experiments with other products, such as raw meat, boiled fish and shrimps have been carried out with similar results.

From other laboratory experiments it also appears that it is possible without any after-drying to bring the dry content of the material up to about 95 percent which is desired due to the storage stability of the dehydrated product.

However, it is known that after a critical limit for different products has been reached, about 80 percent, the further drying may take place with a more free choice of drying conditions. It is therefore advantageous to complete the drying in a different manner, for instance after tearing up the mat.

The dried fish powder as well as the meat powder having the stated dry content had maintained the small and the taste of the starting material, and the ability of rehydration was most satisfactory.

The experimental results obtained and calculation and project work carried out for an industrial plant show the advantages of the process according to the invention compared with the previously used methods for preservation of food products, vis. that dry rehydratable food products may be prepared substantially more simple and cheap than by freeze drying giving similar products, and also that the process is cheaper than any other types of preservation, for instance deep freezing where also a freezing chain is necessary for distribution and storage.

What is claimed is:

1. In a process for preparing a dehydrated powder of a meat or fish product by carrying out in sequence the steps of freezing the product to be dehydrated, subdividing it into a powder of fibrous particles, distributing this powder on a carrier means and drying it by contacting it at atmospheric pressure with a gaseous drying agent having a temperature above the thawing point of the frozen powder and moving relative to the fibrous particles of the powder, the improvement wherein said powder is distributed as a layer on a porous carrier means through which said drying agent is passed with an even distribution and with a velocity of about 0.5 m/sec. which is sufficiently high to lift and maintain the powder layer in porous condition but sufficiently low so that said powder is not carried away by the flow of drying agent, said drying agent causing a thawing and drying of the fibrous particles which result in adhesion between the individual particles where they touch each other to form a firm porous mat having a thickness of about 15 mm, and after the formation of said porous mat the velocity of said drying agent is gradually increased up to about 5 m/sec. and the drying is continued at said increased velocity to bring the dry content thereof up to about 95 percent, after which said mat is torn up to a dehydrated powder.

2. The process of claim 1 wherein the temperature of the drying agent is increased gradually as its velocity is gradually increased.

3. A process according to claim 1, wherein the temperature of the meat or fish product to be subdivided is −20°C and wherein the air temperature, after the porous mat of about 15mm is formed, is increased to 30°C.

* * * * *